United States Patent
Bossmann et al.

(10) Patent No.: US 10,612,382 B2
(45) Date of Patent: Apr. 7, 2020

(54) METHOD FOR MANUFACTURING GAS TURBINE PART

(71) Applicant: ANSALDO ENERGIA IP UK LIMITED, London (GB)

(72) Inventors: Hans-Peter Bossmann, Lauchringen (DE); Maryam Bahraini Hasani, Lupfig (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 0 days.

(21) Appl. No.: 15/349,394

(22) Filed: Nov. 11, 2016

(65) Prior Publication Data
US 2017/0138198 A1    May 18, 2017

(30) Foreign Application Priority Data

Nov. 12, 2015 (EP) ..................................... 15194211

(51) Int. Cl.
*C23C 24/00* (2006.01)
*F01D 5/08* (2006.01)
(Continued)

(52) U.S. Cl.
CPC ................. *F01D 5/08* (2013.01); *B22F 7/08* (2013.01); *C04B 35/5615* (2013.01); *C04B 35/5618* (2013.01); *C04B 35/6455* (2013.01); *C04B 41/009* (2013.01); *C22C 29/005* (2013.01); *C22C 29/06* (2013.01); *C22C 29/067* (2013.01); *C22C 29/16* (2013.01); *C23C 4/02* (2013.01); *C23C 4/08* (2013.01); *C23C 4/18* (2013.01);
(Continued)

(58) Field of Classification Search
CPC ..... B05D 2259/00; C23C 24/00; C23C 24/08; C23C 24/087
See application file for complete search history.

(56) References Cited

U.S. PATENT DOCUMENTS 4,327,154 A * 4/1982 Rossmann ................ B22F 5/04
419/33
6,375,425 B1 * 4/2002 Lee .......................... C23C 28/00
29/889.721

(Continued)

FOREIGN PATENT DOCUMENTS

EP    1 079 070 A2    2/2001
EP    2 405 029 A1    1/2012
(Continued)

OTHER PUBLICATIONS

ASM Specialty Handbook, Heat Resistant Materials, Editor.:Davis © 1997, 3 pgs (Year: 1997).*

(Continued)

*Primary Examiner* — Nathan H Empie
(74) *Attorney, Agent, or Firm* — Buchanan Ingersoll & Rooney PC

(57) ABSTRACT

The present disclosure relates to building very large gas turbines without changing rotor materials. The gas turbine part can include a structure composed of a metal and a ternary ceramic called MAX phase, having a formula Mn+1AXn, where n=1, 2, or 3, M is an early transition metal such as Ti, V, Cr, Zr, Nb, Mo, Hf, Sc, Ta, and A is an A-group element such as Al, Si, P, S, Ga, Ge, As, Cd, In, Sn, Tl, Pb, and X is C and/or N.

10 Claims, 3 Drawing Sheets

(51) Int. Cl.
*C04B 35/56* (2006.01)
*C04B 35/645* (2006.01)
*C04B 41/00* (2006.01)
*F01D 25/00* (2006.01)
*C22C 29/06* (2006.01)
*F01D 5/28* (2006.01)
*C22C 29/00* (2006.01)
*F01D 5/14* (2006.01)
*C23C 4/02* (2006.01)
*C23C 4/18* (2006.01)
*C23C 4/08* (2016.01)
*B22F 7/08* (2006.01)
*C22C 29/16* (2006.01)
*C23C 24/04* (2006.01)
*C23C 24/08* (2006.01)
*B22F 3/15* (2006.01)

(52) U.S. Cl.
CPC ............ *C23C 24/04* (2013.01); *C23C 24/085* (2013.01); *F01D 5/147* (2013.01); *F01D 5/284* (2013.01); *F01D 25/005* (2013.01); *B22F 3/15* (2013.01); *C04B 2235/77* (2013.01); *C04B 2235/80* (2013.01); *C04B 2235/96* (2013.01); *C04B 2235/9607* (2013.01); *F05D 2220/32* (2013.01); *F05D 2230/42* (2013.01); *F05D 2300/2261* (2013.01); *F05D 2300/2262* (2013.01); *F05D 2300/701* (2013.01)

(56) References Cited

U.S. PATENT DOCUMENTS

| | | |
|---|---|---|
| 8,192,850 B2 | 6/2012 | Brinley |
| 2002/0155316 A1 | 10/2002 | Zheng |
| 2006/0088435 A1 | 4/2006 | Gupta et al. |
| 2010/0029517 A1* | 2/2010 | Oboodi .................. F16C 33/12 508/108 |
| 2010/0047614 A1* | 2/2010 | Brinley .................... C23C 4/06 428/615 |
| 2010/0055492 A1 | 3/2010 | Barsoum et al. |
| 2011/0104464 A1 | 5/2011 | Pyzik et al. |
| 2011/0143162 A1 | 6/2011 | Merrill et al. |
| 2012/0301312 A1 | 11/2012 | Berczik et al. |
| 2013/0052438 A1 | 2/2013 | Hu et al. |
| 2015/0199952 A1* | 7/2015 | Amini ..................... C04B 35/56 75/242 |
| 2015/0361825 A1 | 12/2015 | Amini et al. |
| 2016/0024955 A1 | 1/2016 | Amini et al. |

FOREIGN PATENT DOCUMENTS

| | | | |
|---|---|---|---|
| EP | 2 894 139 A1 | | 7/2015 |
| EP | 2 905 271 A1 | | 8/2015 |
| JP | 61275502 A | * | 12/1986 |
| WO | WO 2014/143266 A1 | | 9/2014 |
| WO | WO 2014/149097 A2 | | 9/2014 |
| WO | WO 2015/080839 A1 | | 6/2015 |

OTHER PUBLICATIONS

Seaver et al "Nickel Base Alloy GTD-222, a New Gas Turbine Nozzle Alloy" © 1991, pp. 1-7 (Year: 1991).*
Search Report dated Apr. 18, 2016, by the European Patent Office for Application No. 15194211.7.
Search Report dated Apr. 18, 2016, by the European Patent Office for Application No. 15194212.5.
Radovic et al., "MAX phases: Bridging the gap between metals and ceramics", American Ceramic Society Bulletin, Apr. 2013, p. 20-27, vol. 92, No. 3.
Smialek et al., "Interfacial Reactions of a MAX Phase/Superalloy Hybrid", Surface and Interface Analysis, vol. 47, No. 8, Jun. 29, 2015, pp. 844-853, XP055264586.
Office Action dated Apr. 11, 2018 in corresponding European Patent Application No. 15 194 211.7.

* cited by examiner

METHOD FOR MANUFACTURING GAS TURBINE PART

BACKGROUND OF THE INVENTION

The present invention relates to the technology of gas turbines.

It further refers to a method for manufacturing such gas turbine part.

PRIOR ART

Today, high efficiency gas turbines operate with very high hot gas temperatures. The actual materials for hot gas turbine parts are nickel super alloys with density of about 8 g/cm$^3$. This relative high density causes high centrifugal forces on various rotor parts, e.g. blades. This problem gets worse, when gas turbines become larger.

On the other hand, ternary ceramics, so called MAX phases, are known, which can have low density of about 4 g/cm$^3$.

Particulars of the material are for example published in an article of M. Radovic and M. W. Barsoum, MAX phases: Bridging the gap between metals and ceramics, American Ceramic Society Bulletin, Vol. 92, Nr. 3, p. 20-27 (April 2013).

Document US 2010/0055492 A1 discloses compositions comprising a MAX phase material having the formula $M_{n+1}AX_n$, wherein M is an early transition metal, A is an A-group element, X one or both of C and N, and n=1-3, wherein the MAX phase material defines a plurality of pores; and, a metal component comprising a low melting point metal, wherein the metal occupies at least some of the pores. Also disclosed are method comprising providing a porous green body comprising a particulate material having the formula $M_{n+1}AX_n$, wherein M is an early transition metal, A is an A-group element, X one or both of C and N, and n=1-3; and, infiltrating at least some of the pores of the green body with a low melting point metal, thereby providing a composite material.

In the past, the use of MAX phases in the technical field of gas turbines has been considered.

Document U.S. Pat. No. 8,192,850 B2 discloses a combustion turbine component including a combustion turbine component substrate and a bond coating on the combustion turbine component substrate. The bond coating may include $M_{n+1}AX_n$ (n=1,2,3) where M is selected from groups IIIB, IVB, VB, VIB, and VII of the periodic table of elements and mixtures thereof, where A is selected from groups IIIA, IVA, VA, and VIA of the periodic table of elements and mixtures thereof, and where X includes at least one of carbon and nitrogen. A thermal barrier coating may be on the bond coating.

Document WO 2014/149097 A2 discloses a turbine engine system including a turbine engine component having an airfoil portion and a tip, which turbine engine component has a MAXMET composite bonded to the tip. The MAXMET composite has MAX phases in a metal matrix.

Document WO 2014/143266 A1 describes a vibration resistant fan guide vane for a gas turbine engine. The fan guide vane comprises a vibration-damping component made of a MAXMET composite. The damping component may be a cover that covers some or all of the fan guide vane body. Alternatively, portions of the fan guide vane body or the entire vane body may be made from MAXMET composites. The disclosure makes use of the ultrahigh, fully reversible, non-linear elastic hysteresis behavior that MAXMET composites exhibit during cyclic elastic deformation in order to damp vibration.

Document EP 2 905 271 A1 refers to a ceramic matrix composite CMC comprising ceramic fibers embedded in a ceramic matrix. The fibers comprise a coating made of a MAX phase. The MAX phase coating can be arranged direct on the surface of the fiber or for example between additional coating layers. The properties of the CMC are improved, preferable the high-temperature capabilities.

SUMMARY OF THE INVENTION

It is an object of the present invention to enable very large gas turbines without changing rotor materials.

It is another object of the invention to provide the application of new materials for gas turbines and new processes for manufacturing their components with reduced specific density and robust mechanical strength.

The gas turbine part according to the invention, which is especially exposed to high temperatures and centrifugal forces within a gas turbine, is characterized in that said gas turbine part has a structure, which is composed of a metal and a ternary ceramic called MAX phase, having the formula $M_{n+1}AX_n$, where n=1, 2, or M is an early transition metal such as Ti, V, Cr, Zr, Nb, Mo, Hf, Sc, Ta, and A is an A-group element such as Al, Si, P, S, Ga, Ge, As, Cd, In, Sn, Tl, Pb, and X is C and/or N, whereby M is in the range of 40-60 at-%, A is in the range of 10-30 at-% and X is in the range of 20-40 at-%, and whereby M+A+X is in the range of 80-100% with 0-20% being other elements which are not listed above and are result of impurities or oxidation.

According to an embodiment of the invention said MAX phase is single phase $Ti_2AlC$ or a composition of two phases, $Ti_2AlC$ and $Ti_3AlC_2$, where the range of the $Ti_2AlC$ phase is 60-95%.

According to another embodiment of the invention said MAX phase is single phase $Ti_3SiC_2$ or a composition of two phases, $Ti_3SiC_2$ and $Ti_4SiC_3$, where the range of the $Ti_3SiC_2$ phase is 60-95%.

According to just another embodiment of the invention said MAX phase is a mixture of two main phases $Ti_3SiC_2$ and $Ti_2AlC$, where the range of the $Ti_3SiC_2$ phase is 40-90%, and whereby two MAX phases are in the range of 50-100% with 0-20% being other MAX phases or elements.

According to a further embodiment of the invention said metal is a Ni or Co based super alloy, or is of the composition MCrAlYX, where M represents Ni, Co or Fe, and X represents other elements with less than 20%.

According to just another embodiment of the invention said gas turbine part has a hollow metal structure comprising one or more cavities, which are filled with said MAX phase material.

According to a further embodiment of the invention said gas turbine part comprises a bulk MAX phase, which is coated with said metal.

The inventive method for manufacturing a gas turbine part according to the invention comprises the steps of:
a) providing a metal suitable for being used in a gas turbine environment;
b) providing a ternary ceramic called MAX phase, having the formula $M_{n+1}AX_n$, where n=1, 2, or 3, M is an early transition metal such as Ti, V, Cr, Zr, Nb, Mo, Hf, Sc, Ta, and A is an A-group element such as Al, Si, P, S, Ga, Ge, As, Cd, In, Sn, Tl, Pb, and X is C and/or N, whereby M is in the range of 40-60 at-%, A is in the range of 10-30 at-% and X is in the range of 20-40 at-%, and whereby M+A+X is in the range of 80-100% with 0-20% being other elements which are not listed above and are result of impurities or oxidation; and c) combining said metal and said MAX phase by powder technology processes and/or spray methods to build said gas turbine part up.

According to an embodiment of the inventive method said metal is Ni or Co based super alloys or MCrAlYX where M represents Ni, Co or Fe and X represents other elements less than 20%.

According to another embodiment of the inventive method said gas turbine part is subjected to a heat treatment or Hot Isostatic Pressing (HIP) process after step c).

Said HIP or heat treatment process may be done at a temperature less than the melting point of said metal and MAX phase for densification and/or stress relaxation at high temperature.

According to a further embodiment of the inventive method, in step c) a metal hollow metal structure of said metal is filled with said MAX phase.

Said metal hollow structure may be pre-oxidized to form a thin TGO (Thermally Grown Oxide) to avoid oxidation and inter-diffusion with said MAX phase.

According to just another embodiment of the inventive method, in step c) a bulk MAX phase is coated with said metal using a spraying process.

Said MAX phase may be pre-oxidized to form a thin TGO (Thermally Grown Oxide) to avoid oxidation and inter-diffusion with said metal.

Said spraying process may comprise one of cold plasma spraying and High Velocity Oxygen Fuel spraying (HVOF).

According to a further embodiment of the inventive method in step c) a metal hollow metal structure of said metal is filled with a mixture of MAX phase and metallic powder, where said MAX phase is 50-100% wt. and said metal powder has a lower melting point than said MAX phase and the metal hollow structure.

BRIEF DESCRIPTION OF THE DRAWINGS

The present invention is now to be explained more closely by means of different embodiments and with reference to the attached drawings.

DETAILED DESCRIPTION OF DIFFERENT EMBODIMENTS OF THE INVENTION

The invention is about producing a gas turbine part, especially rotor heat shield of gas turbine using new materials, design and processing where new materials provides low density and therefore reduce centrifugal force on rotor and new design and processing method facilitate fabrication of the parts.

This allows building very large gas turbines without changing rotor materials. This can be done by application of new materials and processing to manufacture components with reduced specific density and robust mechanical strength.

In this connection, so-called MAX phases, ternary ceramics, are extremely interesting candidates that can fulfill this request, with density of about 4-4.5 g/cm$^3$, thermal expansion coefficient >8×10$^{-6}$ K$^{-1}$, thermal conductivity >50 W/mK at 700° C., fracture toughness >5 MPa·m$^{1/2}$, and high oxidation resistance.

Figure 4:
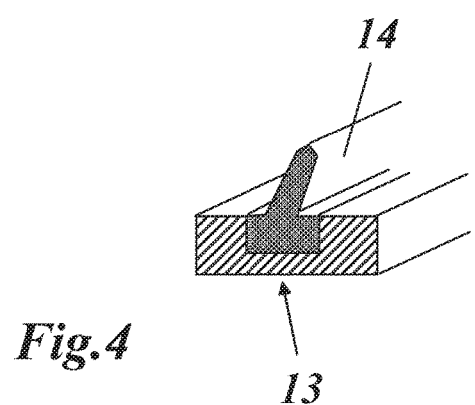
FIG. 4 shows a rotor heat shield with separate parts (fins) on the top of the heat shield, which are made of Max phases, and are inserted into a recess on top of the heat shield.

The proposed solution of using MAX phases with will solve the oxidation problem especially on fins on top of a heat shield (see FIG. 4).

The MAX phases, which are used to produce hot turbine parts by powder metallurgy processes, are a family of ceramics having $M_{n+1}AX_n$ formula, where n=1, 2, or 3, M is an early transition metal such as Ti, V, Cr, Zr, Nb, Mo, Hf, Sc, Ta and A is an A-group element such as Al, Si, P, S, Ga, Ge, As, Cd, In, Sn, Tl, Pb and X is C and/or N. M is in the range of 40-60 at-%, A in the range of 10-30 at-% and X in the range of 20-40 at-%. And M+A+X is in the range of 80-100% and 0-20% elements, which are not listed above and are result of impurities or oxidation.

One preferred composition of MAX phase is single phase Ti$_2$AlC, or two phases, Ti$_2$AlC and Ti$_3$AlC$_2$ (211 and 312), where the range of the 211 phase is 60-95%.

Another preferred composition of MAX phase is single phase Ti$_3$SiC$_2$, or two phases, Ti$_3$SiC$_2$ and Ti$_4$SiC$_3$ (312 and 413), where the range of the 312 phase is 60-95%.

Another preferred composition of MAX phase is a mixture of two main phases Ti$_3$SiC$_2$ and Ti$_2$AlC, where the range of the Ti$_3$SiC$_2$ phase is 40-90%, and whereby two MAX phases are in the range of 50-100% with 0-20% being other MAX phases or elements.

When the gas turbine part is especially a rotor heat shield of a gas turbine, it is produced from a MAX phase and metal by powder technology processes and/or spray methods, and the metal is Ni or Co based super alloys or MCrAlYX where M represents Ni, Co or Fe and X represents other elements less than 20%.

Figure 1:
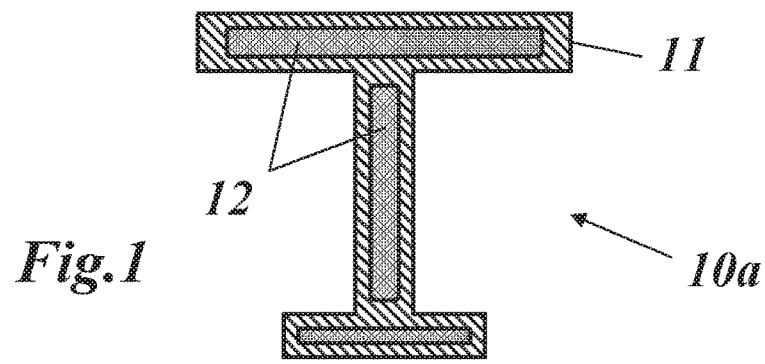
FIG. 1 shows an embodiment of a gas turbine part according to the invention.
Figure 2:
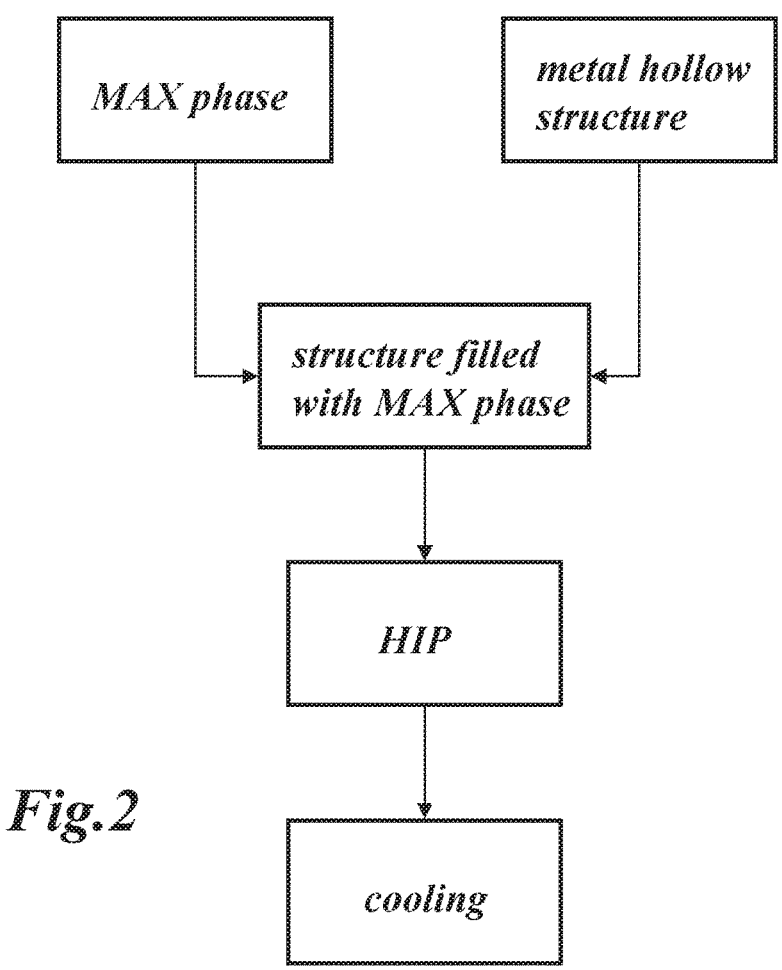
FIG. 2 shows the main steps of the process for manufacturing the gas turbine part of FIG. 1.

As shown in FIG. 1 and FIG. 2, a gas turbine part 10a, which has for example a T-like cross section, is produced from a hollow metal structure 11, whose cavities 12 are filled with MAX phase and will be subjected to a heat treatment and/or Hot Isostatic Pressing (HIP) process. The current method to avoid cracking of parts is inducing compressive stress using methods such as shot peening.

Figure 3:
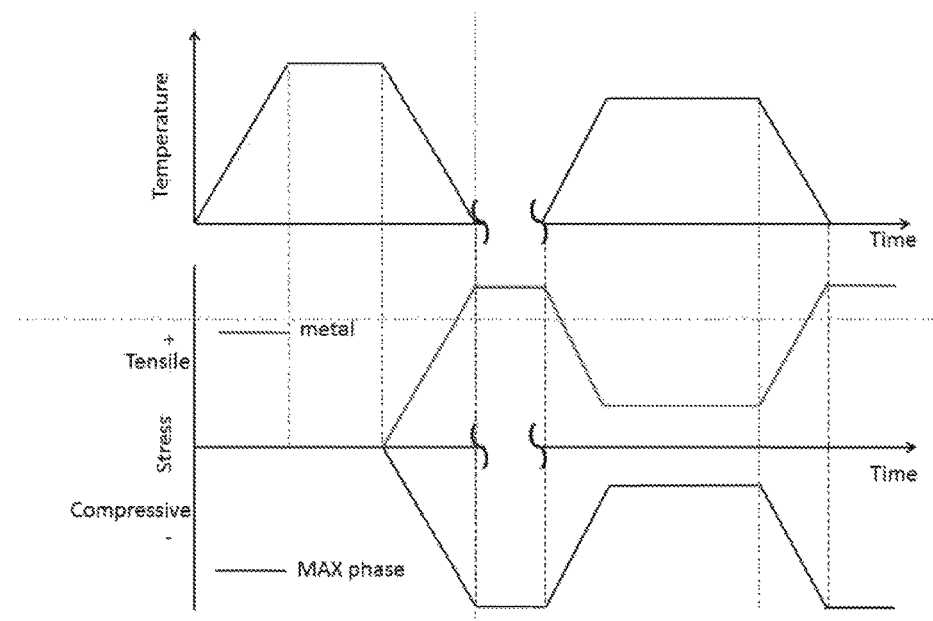
FIG. 3 shows an example of a heat treatment process, which is used to generate compressive stress in the MAX phase.

The present invention proposes a different solution to induce compressive stress. It combines materials such as MAX phase and metals with specific heat treatment methods (see FIG. 3). MAX phase has lower thermal expansion coefficient compared to said metal. By applying a certain heat treatment as shown in an example in FIG. 3 compressive stress is generated in the bulk at operational temperature. The heat treatment process will be done at temperature higher than operational temperature in order to generate compressive stress in the MAX phase. MAX phase will be stress-free at heat treatment temperature and under compressive stress in the range from room temperature to operational temperature.

The metal hollow structure 11 filled with MAX phase contributes to reduce weight compared to a bulk metal part and to increase strength compared to a hollow metal part.

The metal hollow structure 11 filled with a mixture of MAX phase and metallic powder, where MAX phase is 50-100% wt. and metal powder, has lower melting point than MAX phase and the metal hollow structure 11.

HIP or heat treatment is done at temperature less than the melting point of the metal and MAX phase for densification and/or stress relaxation at high temperature. Operational temperatures less than HIP or heat treatment temperature put MAX phase under compression and increase the tensile loading capability of the part.

Figure 5:
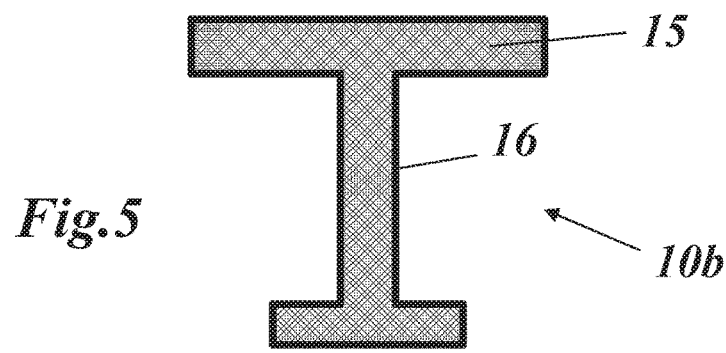
FIG. 5 shows a further embodiment of a gas turbine part according to the invention.
Figure 6:
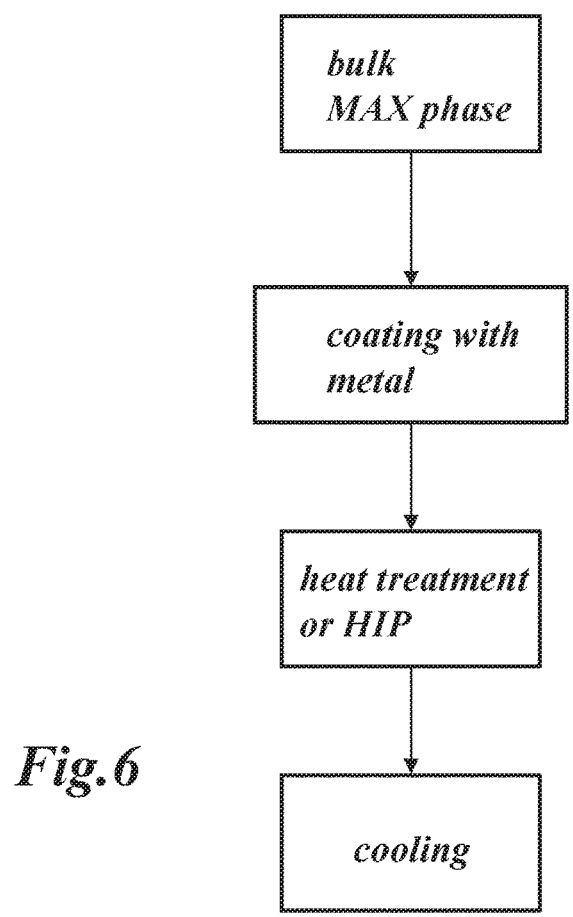
FIG. 6 shows the main steps of the process for manufacturing the gas turbine part of FIG. 5.

As shown in FIG. 5 and FIG. 6, a gas turbine part 10b is produced from bulk MAX phase 15, which is coated with metal (metal coating 16) using spraying methods (e.g. cold plasma spray, HVOF) and then whole part is heat treated or subjected to HIP. HIP or heat treatment is done at temperature less than the melting point of the metal and MAX phase for densification and/or stress relaxation at high temperature (at room temperature MAX phase is under compression due to lower coefficient of thermal expansion). Operational temperatures less than HIP or heat treatment temperature; MAX phase 15 remains under compression which in turn increases the tensile loading capability of the part 10b. The weight of the part 10b is decreased by using MAX phase and the machinability is improved with external metallic layer (metal coating 16).

The MAX phase 15 can be pre-oxidized to form a thin TGO (Thermally Grown Oxide) to avoid oxidation and inter-diffusion with said metal.

The metal hollow structure 11 can be pre-oxidized to form a thin TGO (Thermally Grown Oxide) to avoid oxidation and inter-diffusion with MAX phase.

In addition, according to another embodiment of the invention, as shown in FIG. 4, separate parts (fins 14) on the top of a rotor heat shield 13 may be made of such MAX phases, which fins 14 could be inserted into respective recesses on top of the heat shield 13.

LIST OF REFERENCE NUMERALS 10a,b gas turbine part
11 hollow metal structure
12 cavity
13 rotor heat shield
14 fin
15 bulk MAX phase
16 metal coating

The invention claimed is:

1. Method for manufacturing a gas turbine part configured for exposure to heat and centrifugal forces when installed within a gas turbine, wherein the gas turbine part includes a structure, which is composed of a metal and a ternary ceramic called MAX phase, having a formula $M_{n+1}AX_n$, where n=1, 2, or 3, M is an early transition metal selected from the group consisting of Ti, V, Cr, Zr, Nb, Mo, Hf, Sc, and Ta, and A is an A-group element selected from the group consisting of Al, Si, P, S, Ga, Ge, As, Cd, In, Sn, TI, and Pb, and X is C and/or N, whereby M is in a range of 40-60 at-%, A is in a range of 10-30 at-% and X is in a range of 20-40 at-%, and whereby M+A+X is in a range of 80-100% with 0-20% being elements other than those already listed and are a result of impurities or oxidation, the method comprising:
   a) providing a metal suitable for being used in a gas turbine environment;
   b) providing the ternary ceramic called MAX phase, having the formula $M_{n+1}AX_n$, where n=1, 2, or 3, M is an early transition metal selected from the group consisting of Ti, V, Cr, Zr, Nb, Mo, Hf, Sc, and Ta, and A is an A-group element selected from the group consisting of Al, Si, P, S, Ga, Ge, As, Cd, In, Sn, TI, and Pb, and X is C and/or N, whereby M is in a range of 40-60 at-%, A is in the range of 10-30 at-% and X is in a range of 20-40 at-%, and whereby M+A+X is in a range of 80-100% with 0-20% being elements other than those already listed and are a result of impurities or oxidation; and
   c) combining said metal and said MAX phase by powder technology processes to build said gas turbine part up, wherein in step c) a hollow metal structure formed of said metal is completely filled with said MAX phase.

2. Method as claimed in claim 1, wherein said metal is Ni or Co based super alloys or MCrAlYX where M represents Ni, Co or Fe and X represents other elements less than 20%.

3. Method as claimed in claim 1, wherein said gas turbine part is subjected to a heat treatment or Hot Isostatic Pressing (HIP) process after step c).

4. Method as claimed in claim 3, wherein said HIP or heat treatment process is done at a temperature less than a melting point of said metal and MAX phase for densification and/or stress relaxation at high temperature.

5. Method as claimed in Claim 1, wherein said hollow metal structure is pre-oxidized to form a thin TGO (Thermally Grown Oxide) to avoid oxidation and inter-diffusion with said MAX phase.

6. Method for manufacturing a gas turbine part configured for exposure to heat and centrifugal forces when installed within a gas turbine, wherein the gas turbine part includes a structure, which is composed of a metal and a ternary ceramic called MAX phase, having a formula $M_{n+1}AX_n$, where n=1, 2, or 3, M is an early transition metal selected from the group consisting of Ti, V, Cr, Zr, Nb, Mo, Hf, Sc, and Ta, and A is an A-group element selected from the group consisting of Al, Si, P, S, Ga, Ge, As, Cd, In, Sn, TI, and Pb, and X is C and/or N, whereby M is in a range of 40-60 at-%, A is in a range of 10-30 at-% and X is in a range of 20-40 at-%, and whereby M+A+X is in a range of 80-100% with 0-20% being elements other than those already listed and are a result of impurities or oxidation, the method comprising:
   a) providing a metal suitable for being used in a gas turbine environment;
   b) providing the ternary ceramic called MAX phase, having the formula $M_{n+1}AX_n$, where n =1, 2, or 3, M is an early transition metal selected from the group consisting of Ti, V, Cr, Zr, Nb, Mo, Hf, Sc, and Ta, and A is an A-group element selected from the group consisting of Al, Si, P, S, Ga, Ge, As, Cd, In, Sn, TI, and Pb, and X is C and/or N, whereby M is in a range of 40-60 at-%, A is in the range of 10-30 at-% and X is in a range of 20-40 at-%, and whereby M+A+X is in a range of 80-100% with 0-20% being elements other than those already listed and are a result of impurities or oxidation; and
   c) combining said metal and said MAX phase by powder technology processes to build said gas turbine part up, wherein in step c) a hollow metal structure formed of said metal is completely filled with a mixture of MAX phase and metallic powder, where said MAX phase is 50-99% wt. and said metal powder has a lower melting point than said MAX phase and the metal hollow structure.

7. Method as claimed in claim 6, wherein said metal of the hollow metal structure is Ni or Co based super alloys or MCrAlYX where M represents Ni, Co or Fe and X represents other elements less than 20%.

8. Method as claimed in claim 6, wherein said gas turbine part is subjected to a heat treatment or Hot Isostatic Pressing (HIP) process after step c).

9. Method as claimed in claim 8, wherein said HIP or heat treatment process is done at a temperature less than a melting point of said metal of the hollow metal structure and MAX phase for densification and/or stress relaxation at high temperature.

10. Method as claimed in claim 6, wherein said hollow metal structure is pre-oxidized to form a thin TGO (Thermally Grown Oxide) to avoid oxidation and inter-diffusion with said MAX phase.

* * * * *